United States Patent

Bagnulo

[11] Patent Number: 5,340,161
[45] Date of Patent: Aug. 23, 1994

[54] COUPLING FOR PIPELINES AND THE LIKE

[75] Inventor: Luigi Bagnulo, Milan, Italy

[73] Assignee: Prochind S.p.A., Muggio, Italy

[21] Appl. No.: 869,235

[22] Filed: Apr. 15, 1992

[30] Foreign Application Priority Data

Apr. 15, 1991 [IT] Italy ............................ MI91A001031

[51] Int. Cl.5 ............................................ F16L 59/16
[52] U.S. Cl. ...................................... 285/50; 285/368
[58] Field of Search .................. 285/50, 55, 422, 368;
277/23 A

[56] References Cited

U.S. PATENT DOCUMENTS

| 320,645 | 6/1885 | Fischer | 285/50 |
|---|---|---|---|
| 382,272 | 5/1888 | Robb | 285/50 |
| 1,884,223 | 10/1932 | Rah | 285/50 |
| 2,201,684 | 5/1940 | Kingsbury | 285/368 X |
| 2,569,333 | 9/1951 | Peterson | 285/50 |
| 2,654,834 | 9/1953 | Purkhiser | 285/50 |
| 3,018,119 | 1/1962 | Champion | 285/50 |
| 3,208,773 | 9/1965 | Boudrie | 285/50 X |
| 3,304,105 | 2/1967 | Hill | 285/368 X |
| 3,454,287 | 7/1969 | Thiessen | 285/50 |
| 3,589,873 | 6/1971 | Poth | 285/287 X |
| 3,612,578 | 10/1971 | Bagnulo | 285/50 |
| 3,633,266 | 1/1972 | Taylor | 285/287 X |
| 3,680,200 | 8/1972 | Terrill et al. | 285/287 X |
| 3,926,445 | 12/1975 | Farnam | 277/227 X |
| 4,824,147 | 4/1989 | De Gruijter | 285/55 X |
| 5,139,288 | 8/1992 | Najm et al. | 285/50 |

FOREIGN PATENT DOCUMENTS

| 641087 | 5/1962 | Canada | 255/50 |
|---|---|---|---|
| 745513 | 11/1966 | Canada | 285/50 |
| 1429101 | 1/1969 | Fed. Rep. of Germany | 285/50 |
| 446831 | 3/1968 | Switzerland | 285/50 |

Primary Examiner—Randolph A. Reese
Assistant Examiner—Heather Chun
Attorney, Agent, or Firm—Michael J. Striker

[57] ABSTRACT

A tubular coupling for metal pipes has a flange, a tubular element inserted in the flange and having one end connectable to a pipeline and another end and a ring-shaped insulating element arranged at the other end of the tubular element between the tubular element and the flange.

3 Claims, 2 Drawing Sheets

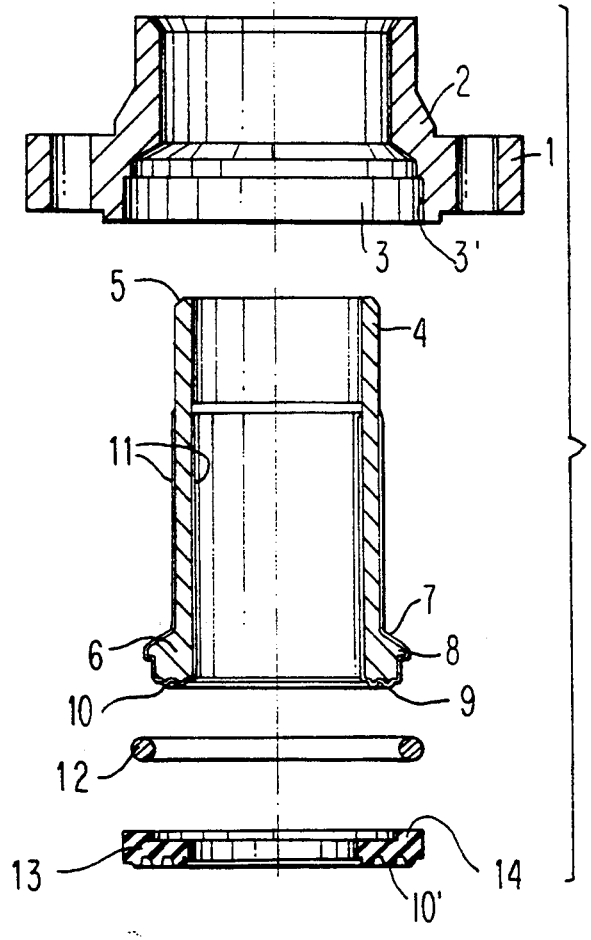
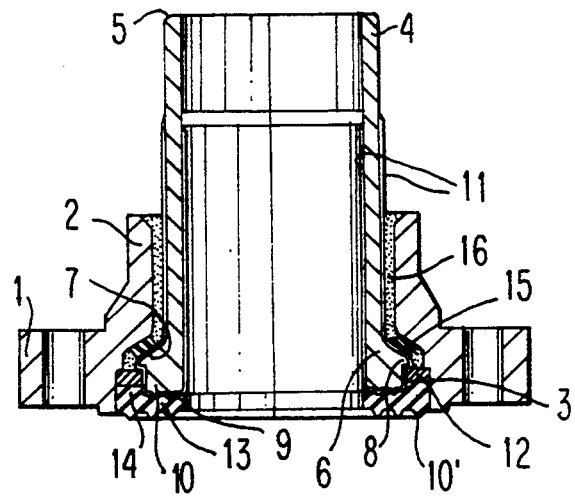
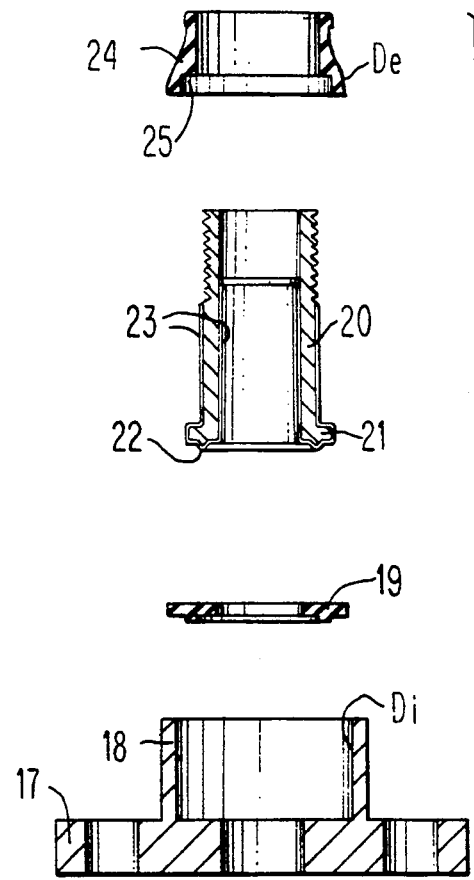
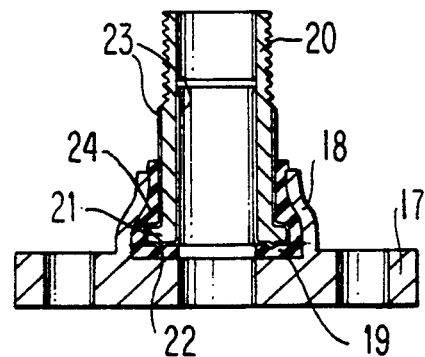

COUPLING FOR PIPELINES AND THE LIKE

BACKGROUND OF THE INVENTION

The present invention relates to a coupling for metal pipelines and the like.

On metal pipelines electrical interruptions have become a hard-felt necessity, either for technical or safety reasons, as a direct consequence of spontaneous and electrolytic phenomena which affect buried pipelines. Attempts have been made to avoid this phenomena by using suitable coatings on pipelines, and also by inserting insulating joints in order to interrupt the electrical continuity. The joint of one type which is used now has a disc which is embedded in hard insulating material and inserted between two flanges, and the flanges are isolated from the bolts and locking nuts by insulating sleeves and insulating washers. The sealing between the flanges and the insulating disc is obtained by means of rectangular or annular gaskets with their housings on the flanges.

The above mentioned traditional insulating joint has to be positioned within an inspection pit so as to allow for the required maintenance due to inconveniences presented by the joint. In fact, periodic tightening of the nuts is needed, caused by the giving of various components. Frequently sleeves have to be substituted as a result of breakage. Finally, the insulating disc has to be cleaned or replaced periodically due to the shortcircuiting of the joint caused by conductive deposits formed on the internal surface of the disc.

SUMMARY OF THE INVENTION

Accordingly, it is an object of the present invention to provide a tubular coupling which avoids the disadvantages of the prior art.

In keeping with these objects and with others which will become apparent hereinafter, one feature of the present invention resides, briefly stated, in a tubular coupling for metal pipelines and the like, which has a tubular element having one end connectable to a pipeline, a flange mounted on the tubular element, and an insulating member arranged at the opposite end of said tubular element and located between the tubular element and the flange.

When the tubular coupling is designed in accordance with the present invention, it eliminates the disadvantages of the prior art.

The coupling can be connected to a normal flange by means of bolts and nuts without resorting to the use of insulating discs, sleeves, washers and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a cross-section of a tubular coupling in accordance with the present invention for medium and large diameter pipes, in assembled condition;

FIG. 2 is a view showing cross-sections of several components of the tubular coupling of FIG. 1;

FIG. 3 is a view showing a cross-section of a tubular coupling in accordance with another embodiment of the present invention for small diameter pipes; and FIG. 4 is a view showing a cross-section of several components of the tubular coupling of FIG. 3.

DESCRIPTION OF THE PREFERRED EMBODIMENTS

Figure 5:
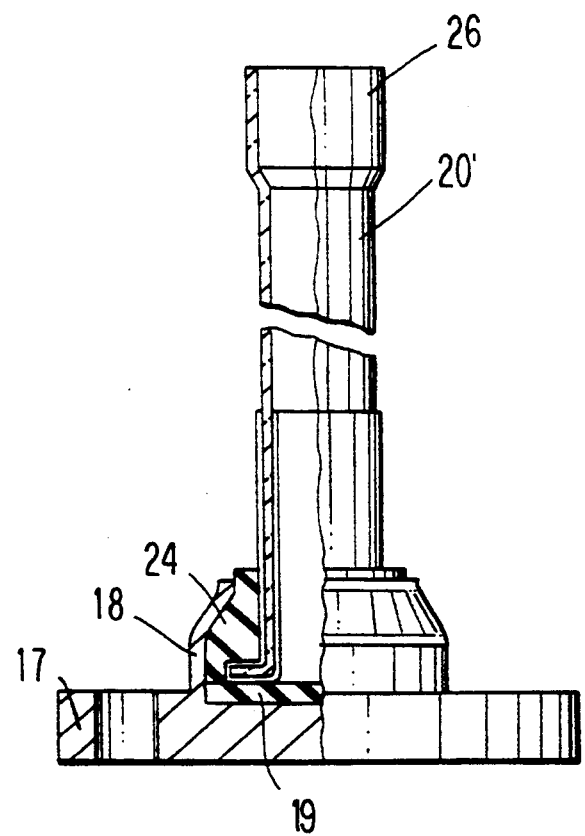
FIG. 5 is a view showing a further embodiment of the invention.

A tubular coupling in accordance with a first embodiment of the present invention shown in FIGS. 1 and 2 has a flange 1 with a collar 2 having an internal diameter greater than the external diameter of a pipeline to which the coupling is to be connected. Starting from its lower surface, the flange has a recess 3. The coupling further has a tubular element 4 with external and internal diameters equal to external and internal diameters of the pipeline to which the coupling is to be connected. The recess 3 is formed so as to accommodate the lower end of the tubular element 4. The lower end of the tubular element 4 terminates in a peripheral cylindrical expansion 6. The expansion 6 has an upper surface 7 formed as a truncated cone, a short circular projection 8, and a lower surface 9 provided with circular ridges 10. The external and internal surfaces of the tubular element 4, including the expansion 6 are covered with a cold- or hot-applied insulating coating 11.

The tubular coupling further has an insulating toroidal sealing ring 12. The internal diameter of the ring 12 is equal to or slightly smaller than the external diameter of the expansion 6 of the tubular element 4, and the external diameter of the ring 12 is equal to or slightly greater than the internal diameter of the recess 3 of the flange 1. The tubular coupling further has a ring-shaped element 13 composed preferably of thermosetting insulating plastic material with a high resistance to compression. The internal diameter of the ring-shaped element 13 is equal to the internal diameter of the tubular element 4. The upper surface of the element 13 has a peripheral circular projection 14. The internal diameter of the projection 14 and the external diameter of element 13 are such that they can be forcibly fitted over the expansion 6 of the tubular element 4 and into the recess 3 of the flange 1. The thickness of the circular projection 14 is such that it can forcibly contain the toroidal sealing ring 12 within the annular space formed by the inner surface 3' of the recess 3 of the flange 1 and the external cylindrical surface of the expansion 6 and the circular projection 8 of the tubular element 4. Therefore an additional sealing guaranty is provided to that ensured by the connection between the lower facial surface 9 of the peripheral cylindrical expansion 6 and the opposing surface of the insulating element 13 which can be connected by a suitable adhesive. The lower surface of the insulating element 13 may be also provided with annular ridges 10'. The upper end 5 of the tubular element 4 is pre-adapted for butt-welding.

The tubular coupling in accordance with the first embodiment is assembled in the following manner:

The tubular element 4 is inserted into the collar flange 1, with at least four rigid insulating spacers 15 fixed on the conical surface 7 of the expansion 6 and spaced from one another by 90°. The toroidal sealing ring 12 is then inserted between the internal surface 3' of the flange 1 and the external surface of the cylindrical projection 6 of the tubular element 4. The element 13 is then forcibly inserted into the end zone of the recess 3 of the flange 1 and the annular projection 14 keeps the toroidal sealing ring 12 under compression. Finally, hot or cold polymerizing resin 16 is filled in the space between the internal surface of the collar 2 of the flange 1 and the external surface of the tubular element 4.

When the thus assembled tubular coupling or the insulating flange is to be connected to another traditional flange, the element 13 acts as a sealing gasket. A traditional sealing gasket can of course also be inserted between the flanges. The tensile loading obtained by tightening of the connecting nuts ensures a perfect sealing both between the coupled flanges and also between the components of the insulating flange.

FIGS. 3 and 4 show another embodiment of the tubular coupling in accordance with the present invention. Here, a flange 17 is of the common flat type and has a welded-on collar 18. A tubular element 20 has a lower end provided with an expansion 21 which has upper and lower surfaces with the external diameter smaller than the internal diameter of the collar 18. The lower surface of the expansion 21 can also be provided with annular ridges 22. The upper end of the tubular element 20 is threaded or pre-adapted for butt welding- A large area of the external and internal surfaces of the tubular element 20, including the expansion 21, is coated with an insulating material 23.

A sleeve 24 is fitted on the tubular element 20 and composed of highly resistant pressed insulating material. The cylindrical internal surface of the sleeve has a diameter equal to the external diameter of the tubular element 20. Its lower part has a recess 25 to accommodate the expansion 21 of the tubular element 20. The sleeve 24 has one end with an external diameter De which is slightly greater than the internal diameter Di of the collar 18 so that the sleeve can be forcibly inserted into the collar. The diameter De of the sleeve 24 is gradually reduced so as to form a first convex portion and a following concave portion. The total axial length of the sleeve 24 is greater than the length of the collar 18.

In order to assemble the tubular coupling of the second embodiment the tubular element 20 together with the sleeve 24 is inserted into the collar 18, in which an insulating sealing washer 19 has been previously positioned. The collar 18 is then deformed for example by a pressing die, until it forcibly conforms to the external surface of the sleeve 24. When the collar 18 has been deformed, or in other words when the coupling performs a perfect locking, the sleeve 24 will protrude to a certain length beyond the edge of the collar 18. Thus, the external surface of the tubular element 20 is kept spaced from the collar 18.

The lower surface of the rigid plastic element 13 may have a superficial layer within the range of a millimeter thick capable of acting as a sealing gasket. The rigid plastic element 13 can be also provided with one or more annular grooves to accommodate sealing rings. The flange 1 can be also composed of cast-iron, apart from being of steel to isolate cast-iron pipelines from steel pipelines. The recess 3 of the flange 1 and the expansion 6 of the tubular element 4 may have different shapes as long as their opposing surfaces form a space of a few millimeters capable of containing the elastomeric sealing element. The tubular element 20 may also be composed of copper with its free bell-shaped end to be connected to a copper pipe by means of brasing.

As can be seen from FIG. 5, the upper end of the tubular element 20' can be bell-shaped to be connected to a copper pipe by brazing.

It will be understood that each of the elements described above, or two or more together, may also find a useful application in other types of constructions differing from the types described above.

While the invention has been illustrated and described as embodied in a tubular coupling for metal pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A tubular coupling for metal pipes, comprising a flange composed of metal and having a flange part, an axially extending collar and a recess; a tubular element composed of metal and inserted in said flange so as to extend through said collar of said flange and having one end extending axially outwardly beyond said collar and connectable to a pipeline and another end provided with a peripheral expansion inserted in said recess of said flange, said flange and said tubular element being the only components of the tubular coupling which are composed of metal and each being formed as a one piece metal component; and an electrically insulating element arranged between said metal flange and said metal tubular element so as to be located between said recess of said flange and said expansion of said tubular element and extending over a radial outer surface of said expansion so as to electrically insulate said metal tubular element from said metal flange, said electrically insulating element extending over an outer surface of said expansion of said tubular element, said peripheral expansion having also an inner surface formed as a truncated cone and a short circular projection.

2. A tubular coupling as defined in claim 1, wherein said tubular element is inserted into said flange with at least four rigid insulating spacers fixed on said inner truncated cone surface of said peripheral expansion.

3. A tubular coupling as defined in claim 1; and further comprising an insulating sealing ring located between said electrically insulating element, said circular projection of said expansion and said flange so as to provide for an additional sealing guaranty.

* * * * *